United States Patent

Gurka

[15] 3,640,014
[45] Feb. 8, 1972

[54] FISHHOOK WITH WEED GUARD

[72] Inventor: Philip W. Gurka, 180 Bellevue Ave., Upper Montclair, N.J. 07043

[22] Filed: Apr. 30, 1970

[21] Appl. No.: 33,406

[52] U.S. Cl............................................43/42.43, 43/42.6
[51] Int. Cl. ..................................................A01k 85/00
[58] Field of Search.........................................43/42.43, 43.6

[56] References Cited

UNITED STATES PATENTS

| 3,231,999 | 2/1966 | Gurka....................................43/42.43 |
| 2,145,283 | 1/1939 | Accetta..................................43/42.43 |
| 2,538,052 | 1/1951 | Schwarzer.............................43/42.43 |
| 2,635,381 | 4/1953 | Coons.....................................43/42.43 |
| 2,206,486 | 1/1940 | Nelson....................................43/42.43 |

*Primary Examiner*—Melvin D. Rein
*Attorney*—Harry Sommers and Howard N. Sommers

[57] ABSTRACT

A fish lure and/or hook with a self-locking detachable weed guard comprising a hooked portion terminating in a barbed point and with a relatively straight shank, an enlarged portion mounted on said shank and providing a transverse abutment formed on a prong outstanding from the shank in the plane of said hooked portion, an eye carried by one of said associated members and lying so as to provide a transverse abutment spaced from the prong, a weed guard comprising a one-piece elongated flexible normally flat strip attached to the shank and with a slot near one end for receiving said point and the adjacent portion of the bend of the hook as they curve toward the strip, said strip being bent over on itself, with the bend of said hook adjacent said point passing through said slot, the strip normally engaging and exerting shielding force on the inner side of the barbed point from the shank, said strip being stabilized with respect to the hook by having a series of elongated slots to receive the eye while folded to aperture-registry and pushed on, the folded portion being then given a quarter turn to resiliently lock between the eye and the adjacent surface of the abutment with said prong fitting a slot in the folded portion of said guard to prevent unintentional removal thereof.

8 Claims, 7 Drawing Figures

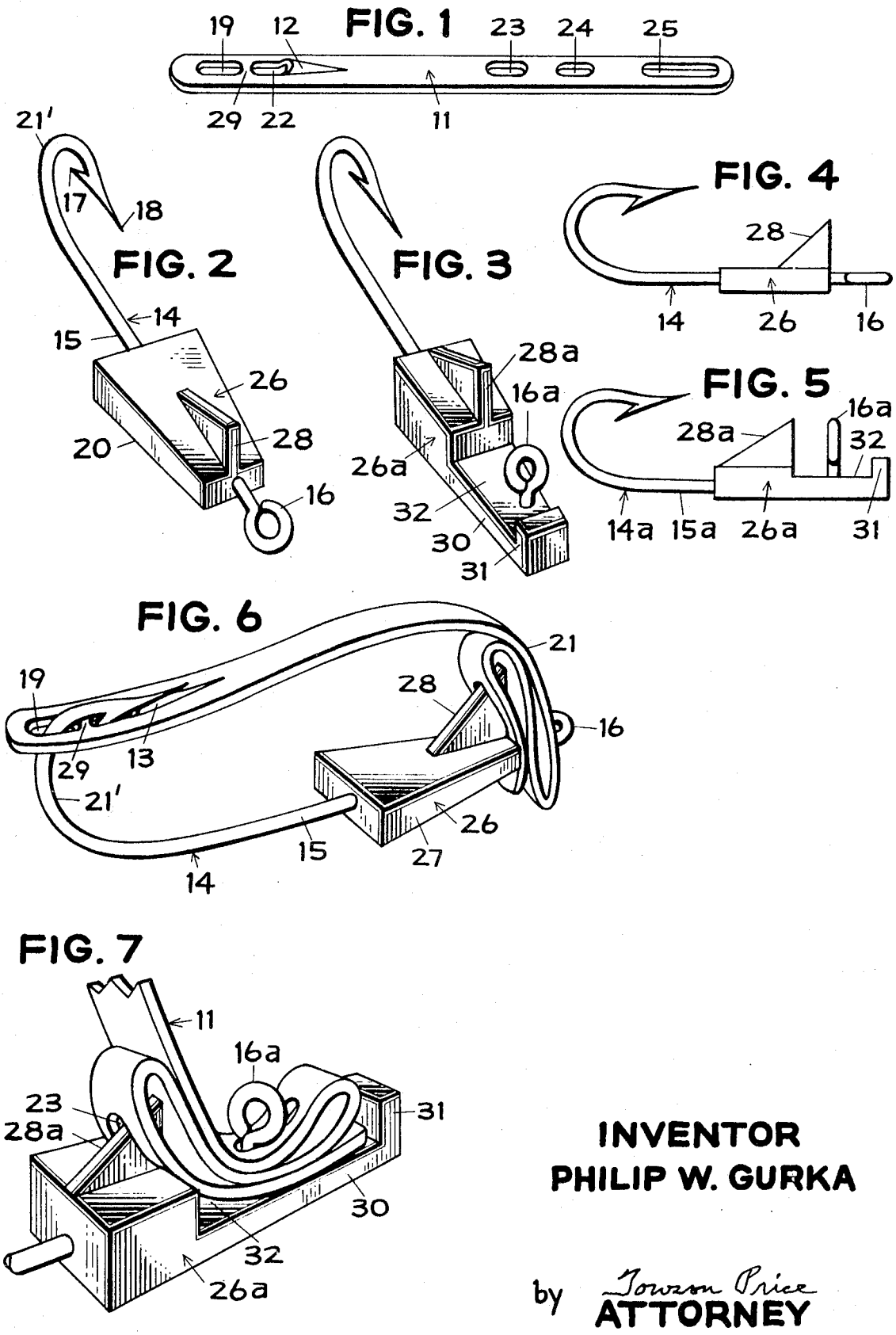

FISHHOOK WITH WEED GUARD

SETTING AND OBJECTS OF THE INVENTION

The invention relates to improvements in stabilizing a detachable weed guard that is elongated in shape and flexible, one end having a plurality of apertures, being folded to aperture registry and pushed on the eye of the hook to the adjacent surfaces of a lure, then given one quarter turn to resiliency lock the guard between the eye of the hook or lure and an adjacent surface.

While the resilient locking is adequate for top water lures, such as poppers that float, with the guard riding under the popper, and which glide over obstructions, it is not entirely adequate for underwater lures that are dragged through unseen obstructions, with the guard on the top side of the lure. The tendency of such a guard, when meeting heavier unseen obstructions, is to deviate from the quarter turn given to resiliently lock it to the hook or lure, causing the guard to become detached. This is undesirable and demands firmer stabilization.

An object of the improvement is to provide lock means for hooks or lures that will readily and firmly stabilize a detachable weed guard.

Another object is to provide proper alignment of a weed guard between its lock means and the point of the hook.

A further object is to insure the weed guard staying attached to the hook or lure during the process of removing fish.

A still further object of the present invention is to provide lock means for hooks or lures which is inherently attractive and ornamental in appearances, being in one piece which is relatively simple, easy and economical to produce.

A further object is to provide a guard which applies a critical pressure to the hook adjacent the point and barb.

The foregoing and other advantages and superiorities of the weed guard and lock of the present invention will become more readily comprehensible by the accompanying drawing and description following. It is understood, however, that the embodiment is shown by way of illustration only to make the principles and practice of the invention more readily comprehensible, and without any intent of limiting the invention to the specific details shown.

BRIEF DESCRIPTION OF THE FIGURES

In the drawings:

FIG. 1 is a perspective view of a form of weed guard before being attached to a lure and associated hook.

FIG. 2 is a perspective view of one form of hook and associated lure.

FIG. 3 is a perspective view of another form of hook and another form of associated lure.

FIGS. 4 and 5 are side-elevational views of the forms of hooks and lures shown in FIGS. 2 and 3, respectively.

FIG. 6 is a perspective view of the weed guard of FIG. 1, as it appears assembled with a hook and lure as illustrated in FIG. 2.

FIG. 7 is a fragmentary perspective view of the lure and adjacent portion of the hook as illustrated in FIG. 3 with the adjacent portion of a weed guard assembled therewith.

DETAILED DESCRIPTION

Referring to the blank of the weed guard 11, shown in FIG. 1, it will be seen that I have applied to it a protrusion 12 which makes a recess 13 on the opposite side. The weed guard 11 is formed from flexible material, thin but stiff enough to tend to return to its original shape after bending. It is of such length as to form a proper weed guard when bent and assembled with a hook. The bending of the guard provides the spring action necessary to hold and regain the position of seating the hook point in the recessed seat 13, the barb 17 in the aperture 22, and also provides a crucial tension at the hook point and barb.

FIRST EMBODIMENT

Essentially, my invention involves, as a first form, illustrated in FIGS. 1, 2, 5 and 6, a removable weed guard 11 combined with a fishhook 14 having a relatively straight shank or shaft, such as indicated at 15 in FIGS. 2, 5 and 6, provided at one end with an eye 16 and at its other end with a reverse bend which terminates in a pointed end with a barb 17. The pointed end 18 is reversed in the recessed seat 13 of the guard, and extends in the same general direction as the shank 15 from the reverse bend. The eye 16 is here shown at the free end of the shank 15, although it may be formed as part of an associated lure or sinker, here designated 26.

The guard 11 comprises the one-piece elongated flexible, normally flat strip of FIG. 1 with a slot 19 near one end for receiving the pointed portion of the hook 14 as it curves toward the guard 11. Said guard is bent over on itself, as indicated at 21, to exert from the shank a shielding force on the barbed point, whereby one end portion of the said guard shields said pointed end portion, while it is lying on the side of said strip opposite the shank and said guard is resiliently held thereagainst.

The recessed seat 13 is desirably positioned at the inner end of a second slot or aperture 22, for receiving the point portion 18 and barb 17 of the hook as they curve toward said strip. Said seat portion is the obverse of the outwardly embossed portion or protrusion 12. The barb 17 is received in the aperture 22, the bridge 29 between it and the slot 19 locking the barb against movement toward the outer or free end of the guard. At the other end portion of the guard there is also a plurality of apertures or slots, in this instance three, designated 23, 24, and 25, through which the shank 15 and its eye 16 enter and leave. In this instance the shank carries a lure 26 desirably formed of a plastic or heavy metal, lead being an example, cast in place thereon. It comprises a body portion 27 shaped as illustrated, with a base 20, the plane of which is substantially parallel to the plane of the eye 16, and a fin or prong 28, desirably triangular in side elevation, upstanding therefrom.

The application of a guard 11 to a combined hook and lure may be as follows: the end portion of the guard 11, which is provided with the slots 23, 24 and 25, is folded to a zigzag in which there is an approximate registry between said slots. The hook eye 16 is then inserted in succession through the slots 23, 24 and 25, while turned through a 90° vertical angle from the position illustrated, then moved to the position of FIG. 6. This zigzag after being given such a quarter turn effects a resilient locking thereof between the hook eye 16 and the adjacent face of the prong 28, that is, between said eye and said face acting as stop means, for holding the zigzag compressed. Locking in this position is effected by a reception of the adjacent portion of the prong 28 in the slot 25.

The opposite end of the weed guard is then applied to the hook point 18 by bending the free end of the guard toward it and inserting the hook point through the hook bend slot 19, allowing said point to rest in the recessed seat 13. The inner side of the pointed end portion is shieldingly engaged by the guard along the length of said end portion, from the point to at least where the barb projects from the hook, with the point of the barb 17 overhanging the bridge 29 between the apertures 19 and 22. The snap portion of a fishing line may be attached through the hook eye 26. To remove the weed guard, the above process is reversed.

The spring or tension of the weed guard can then be adjusted by placing the thumb on top of the weed guard bend and the forefinger on the bottom of the hook eye, then gently depressing the guard between thumb and forefinger. The spring can be tested by depressing the end where the hook bend aperture 19 rides up and down the hook bend 21', to see that the action is free and smooth.

This completes the description of the first embodiment of the present invention. It will be apparent that the weed guard and lure thereof are of inherently attractive and decorative appearance.

SECOND EMBODIMENT

A second form of my invention is illustrated in FIGS. 1, 3, 5 and 7. The differences between this second form and the first form reside in the fact that here the plane of the eye 16a is parallel to the end of the prong 28a which upstands from the lure-sinker 26a, rather than perpendicular to said plane, and said lure-sinker extends beyond the eye rather than terminating short of it.

The eye 16a may be integral with the shank 15a of the hook 14a and formed on an end portion bent up at a right-angle to said shank, or it may be formed on the end of a wire, the lower part of which is cast in place with the lure 26a during the forming operation of the latter.

In the present form, the lure extension 30 terminates in an upstanding flange 31 forming a seat 32 on which is adapted to rest the zigzag formed by folding the end portion of a guard 11 carrying slots 23, 24 and 25, like the guard of the first embodiment. After forming and placement of the hook 16a through the zigzag while the guard is displaced through a 90° horizontal angle from the position illustrated in FIG. 7, the guard is then rotated back to that position until the slotted portion of the zigzag snaps to locked position as it receives the prong 28a.

It will be understood that in both forms the lure-sinkers are attractively colored or decorated and the details not specifically described for the second embodiment may be as described for the first embodiment.

It will be further apparent that numerous modifications and variations in the weed guard of the present invention may be made by anyone skilled in the art, in accordance with the principles of the invention hereinabove set forth, and without the use of any inventive ingenuity. I desire, therefore, to be protected for any and all such modifications and variations that may be made within the spirit of the invention and the scope of the claims hereto appended.

I claim:

1. In combination with a fishhook member having a relatively straight shank provided at one end with a reverse bend which terminates in a barbed pointed end portion extending in the same general direction from said reverse bend as said shank, a lure member associated with said hook and formed with a prong outstanding from the shank in the plane of the hooked portion, an eye carried by one of said associated members, a weed guard comprising a one-piece elongated flexible normally flat strip attached to the shank and with a slot means near one end for receiving said pointed end portion and the adjacent portion of the bend of the hook as they curve toward the strip, with the bend of said hook adjacent to and the pointed end portion passing through said slot means, the strip normally engaging and exerting shielding force on the inner side of the barbed point from the shank, said strip being stabilized with respect to the hook by having a series of elongated slots near the end thereof to receive the eye while said strip is folded to slot registry and pushed on, the folded portion being then given a quarter turn to resiliently lock between the eye and the adjacent surface of the lure, with said prong fitting the endmost of said slots in the folded portion of said guard to prevent unintentional removal thereof.

2. In a combination as recited in claim 1, wherein the eye is carried by the shank portion.

3. In a combination as recited in claim 2, wherein the eye is positioned at the end of a straight shank.

4. In a combination as recited in claim 2, wherein the straight end portion of the shank is bent up parallel to the adjacent surface of the prong.

5. In a combination as recited in claim 1, wherein the slot means to receive the pointed end portion is formed as an end aperture through which the barbed end first passes, and another aperture spaced therefrom, which holds the barb and prevents undesired movement of the guard with respect thereto.

6. In a combination as recited in claim 1, wherein the quarter turn is through a vertical angle.

7. In a combination as recited in claim 1, wherein the quarter turn is through a horizontal angle.

8. In a combination as recited in claim 1, wherein the eye is on a part of the lure and not integral with the hook.

* * * * *